Dec. 5, 1967  U. H. KOCH ET AL  3,356,335
SAMPLE CYLINDER VALVE

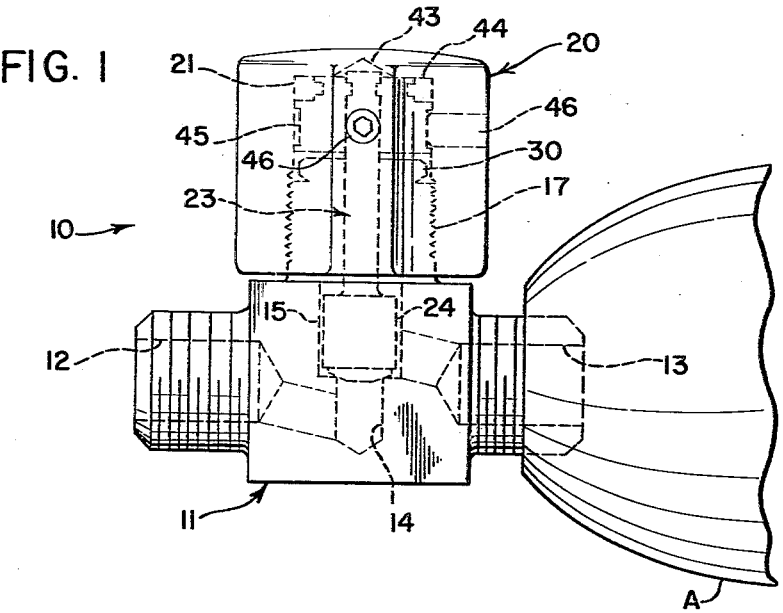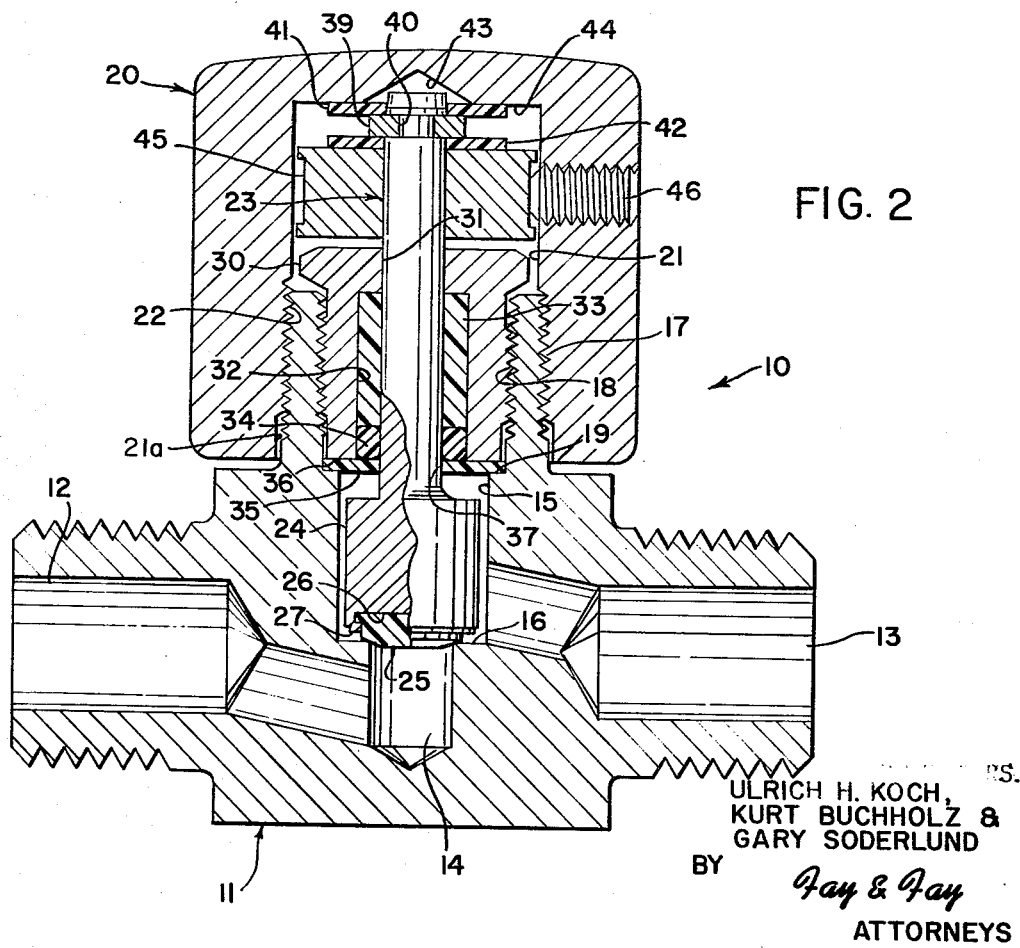

Filed March 31, 1965  2 Sheets-Sheet 2

INVENTORS.
ULRICH H. KOCH,
KURT BUCHHOLZ &
GARY SODERLUND
BY  *Fay & Fay*
ATTORNEYS

United States Patent Office 3,356,335
Patented Dec. 5, 1967

3,356,335
SAMPLE CYLINDER VALVE
Ulrich H. Koch, Pinole, Kurt Buchholz, El Cerrito, and Gary A. Soderlund, Richmond, Calif., assignors to Whitey Research Tool Co., Emeryville, Calif., a corporation of California
Filed Mar. 31, 1965, Ser. No. 444,158
7 Claims. (Cl. 251—214)

ABSTRACT OF THE DISCLOSURE

A valve having a body with a fluid passage therethrough including inlet and outlet ports. A valve chamber communicates with the inlet and outlet ports in the body and defines a valve seat. The body includes an outwardly extending bonnet which receives an internal packing nut and packing assembly. A stem reciprocally mounted in the valve chamber has one end extending through an aperture in the packing nut and the other end adapted to engage the valve seat. A handle having a central chamber therein is threaded to the exterior of the bonnet and encloses the stem and packing nut. Means are also provided to interconnect the handle with the extending end of the stem whereby rotational movement of the handle produces longitudinal movement of the stem without rotation thereof.

This invention relates to a valve adapted for use with a sample cylinder.

Sample cylinders are used to store a sample of gas or fluid for a diversity of purposes such as analysis by gas chromatography or other analytical methods. These cylinders are used to store the gas prior to the time when the analysis is to be made. After cylinders of the type herein contemplated have been used, they frequently are dropped, tossed about or otherwise abused. The immediate result is that the conventional valve ordinarily used in association with such cylinders is either broken and must be replaced or no longer is operable to seal the cylinder.

The principal weak points on the conventional valve are the handle, which is plastic and can easily be broken, and the stem which protrudes out of the valve and is easily bent. Also the conventional valve is too large for ordinary service with a sample cylinder.

Another type of use of a sample cylinder gives rise to another problem in the valve associated therewith. Thus, it frequently occurs that a sample of gas will be stored in the cylinder under pressures in the vicinity of 3,000 p.s.i. Samples of this gas may be withdrawn periodically so that the valve and its associated seals are under extremely high pressures over a prolonged period of time. In such circumstances, the seals provided by the valve must be adequate to withstand these pressures, yet the operation of the valve under these extreme pressures must be as easy as possible.

Accordingly, it is an object of this invention to provide a valve which is small, compact and highly resistant to abuse.

A further object of this invention is to provide a valve adapted to be used with a sample cylinder which includes a fully protected stem and a novel sealing arrangement for the stem.

A more specific object of the invention is to provide a valve wherein the stem is nonrotating and where all threaded joints are external to the seals so that the operating mechanism for the stem may be lubricated without affecting the interior cleanliness of the valve.

It is a further object of this invention to provide a sample cylinder valve wherein the stem is nonrotating and is secured to and is actuated by a handle through a direct interconnection in one direction of travel of the stem and an indirect connection in the opposite direction of travel of the stem.

More specifically the objects of this invention are incorporated in a valve which comprises a valve body having a passage therethrough, a bonnet on said valve body and a valve chamber including a valve seat in said fluid passage. A handle is threadedly carried on said valve bonnet, said handle including an internal chamber in which said bonnet is received. A valve stem is in said chamber, said valve stem having one end thereof engaged with the valve seat with the other end of said stem being opposed to the interior end of the chamber in said handle. A retaining washer is secured to the other end of said stem with gasket means interposed between said retaining washer and the interior end of said chamber. A bushing surrounds the stem adjacent said other end thereof and a gasket is interposed between said bushing and said retaining washer. Means on said handle and engaged with said bushing secures said bushing to said handle for rotation and longitudinal movement therewith. A packing nut is disposed in said chamber in said handle and is threadably received in said bonnet, said packing nut having a bore through which said stem is received. The packing nut is further provided with a counterbore and a guide bushing in the counterbore surrounding a portion of said stem. A gasket at the inner end of said packing nut has an aperture permitting passage of the stem therethrough, said gasket being clamped by said packing nut against a portion of said valve body to provide a seal between said valve body and said packing nut. An O-ring is disposed in the counterbore in said packing nut, said O-ring surrounding said stem and being disposed between said guide bushing and said gasket.

Further objects and features will become more apparent upon a complete reading of the following description which sets forth in detail but one approved means of carrying out the invention. Such disclosed means is not meant to be limiting inasmuch as it constitutes but one of the various ways in which the principles of the invention may be applied.

In the drawings wherein like reference numerals indicate like parts in the various views:

FIG. 1 is a side elevation view showing the valve as it is attached to a sample cylinder;

FIG. 2 is a side elevation view in section showing the relationship of the parts comprising the instant invention;

Figure 3:
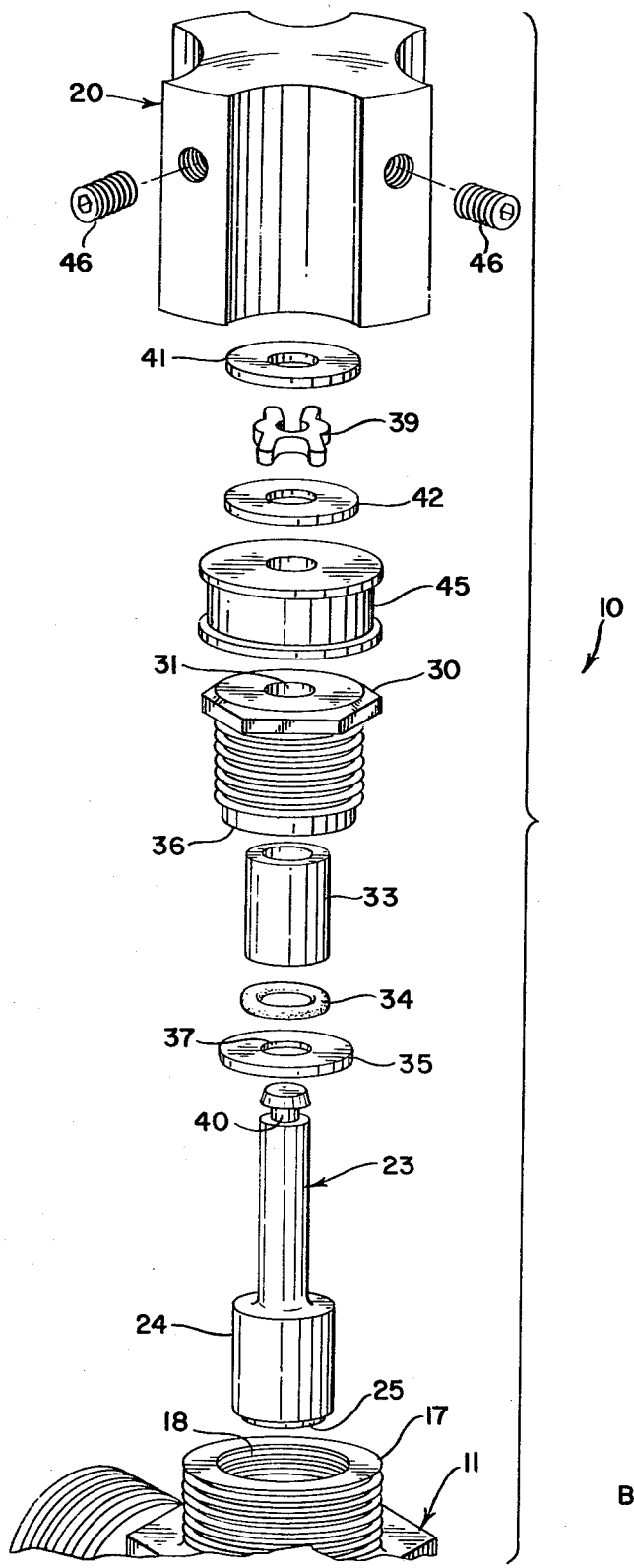
FIG. 3 is an exploded perspective view illustrating the various components comprising the instant invention.

Referring first to FIG. 2, there is illustrated the valve, indicated generally by the reference numeral 10, which comprises the instant invention. This valve has a valve body 11 with coaxially aligned bores 12 and 13. These bores are interconnected by a crossbore 14. A counterbore 15 coaxial with the crossbore 14 and opening upwardly of the valve body 11 defines a valve chamber. The transverse shoulder 16 at the juncture of the crossbore 14 and the counterbore 15 defines a valve seat.

The valve body 11 has a bonnet portion 17 which is counterbored and threaded at 18 coaxial with the crossbore 14 and the counterbore 15. A transverse shoulder 19 is formed at the jucture of the two counterbores 15 and 18.

Threadedly received over the bonnet 17 is a handle or cap 20. The handle includes a central chamber 21 with threads 22 on a portion of the walls of that chamber and being in cooperation with threads on the exterior of the bonnet 17. The threads 22 engage the threads on the bonnet 17 over a substantial length as is apparent in FIGURE 2. The threads 22 terminate above the lower end of the chamber 21 leaving a counterbored portion 21a at the entrance to the chamber. The unthreaded portion 21a protects the active threads of the bonnet 17 when the valve is in an open position and the handle 20 has been moved up to expose more of the bonnet. The height of the unthreaded section, as seen in FIG. 2 should be at least substantially equal to the travel of the stem 23. Disposed in the chamber 21 is a valve stem 23. The stem has an end portion 24 thereof disposed in the valve chamber 15. This end 24 of the stem 23 is enlarged in diameter to minimize the dead space in the valve when the valve is closed. A seat 25 is secured in the end 24 of the stem 23. This seat 25 is received in a recess 26 formed in the end of the stem with a portion 27 of the stem being rolled over to form a retaining lip to maintain the seat 25 in the recess 26. The seat 25 is made of a soft material, preferably either Kel-F or glass filled Teflon, and is substantially blunt shape so that a minimum amount of longitudinal travel of the stem 23 is required to place the stem in a full open position.

To provide a guiding and sealing arrangement for the stem 23 a packing nut 30 is threadedly received in the counterbore 18. The packing nut includes an aperture 31 in the upper end thereof through which the stem 23 protrudes. A counterbore 32 is formed in the packing nut coaxial with the aperture 31. A guide bushing or packing gland 33 is disposed in the counterbore 32. This packing gland is cylindrical in configuration and surrounds a portion of the stem 23. Also received in the counterbore 32 and encircling the stem 23 is an O-ring 34 which is contiguous to the gland 33. The gland 33 is preferably fabricated from a glass filled Teflon but may be made from plain Teflon or any other suitable synthetic.

Retention of the gland and the O-ring in the counterbore 32 is accomplished by a washer gasket 35. This gasket is interposed between the end 36 of the packing nut 30 and the transverse shoulder 19 with a central aperture 37 in the gasket 35 permitting the stem 23 to pass therethrough. It is apparent that the combination of the washer 35 and the gland 33 provides a groove for the O-ring. Moreover, the washer provides a seal at the shoulder 19, thereby isolating the threaded connection 18 from the fluid in the system. In addition, the static pressure in the system acting against the washer 35 provides a seal of the O-ring at its outer diameter against the packing nut and the glass filled Teflon gland 33. The inside diameter of the O-ring forms a moving seal on the stem 23. The fact that the O-ring seals against the stem upon its inside diameter is of significance in a valve such as this which is designed to operate at pressures of 3,000 p.s.i. or higher. By having the O-ring seal at its inner diameter, the stem may be reduced in diameter thereby reducing the required operating force for the valves. Also the synthetic packing gland 33 provides a low friction guide for the stem 23. Since Teflon is relatively soft and will deform or cold flow internal pressure of the system will make the gland 33 fit closely against the stem and provide an ideal seal point for an O-ring because of the absence of any clearance into which the O-ring may be extruded.

As an actuator for the stem 23 the design disclosed herein eliminates any possibility of damage to the stem in the event the valve is dropped or otherwise abused. Thus, it is desired to isolate the stem 23 from the handle 20 so that any impacts on the handle will not be transmitted to the stem. This is accomplished by attaching to the upper end of the stem 23 a snap ring retaining washer 39 which is received in a groove 40. A thrust washer 41 is received over the end of the stem 23 and a second thrust washer 42 is disposed on the stem 23 under the retainer washer 39. A recess 43 is formed in the central area of the end wall 44 of the chamber 21 in the handle 20. This recess 43 accommodates the extreme upper end of the stem 23. Encircling the stem 23 is a bushing 45. The bushing is rotatable on the stem 23 and is secured by set screws 46 to the handle 20 whereby the bushing and the handle are connected for unitary movement.

The operation of the valve is as follows: One end of the valve 10 may be threadedly received in a sample cylinder A, a portion of which is shown in FIG. 1. The other end of the valve may be connected to a source of gas whereby the cylinder A may be filled. To actuate the valve to permit introduction of the gas in the cylinder the handle 20 is rotated which causes axial movement of the handle on the threads on the bonnet 17. The rotating movement of the handle 20 is not transmitted to the stem 23. As the handle 20 is axially displaced, the bushing 45 which is secured to the handle 20 by the set screws 46 is also displaced along the stem 23 and engages the thrust washer 42. The thrust washer 42 in turn engages the snap ring retaining washer 39 which is secured to the handle of the stem 23. Therefore, as the cap is axially displaced, the stem 23 is carried therealong. Axial displacement of the stem 23 displaces the seat 25 from the valve seat 16 thereby permitting the introduction of gas into the cylinder A. Reverse rotation of the handle 20 will, of course, cause the handle to be threaded axially on the bonnet 17. In such circumstances, the end wall 44 of the handle 20 abuts the upper thrust washer 41 and as the handle is rotated, a longitudinal, nonrotating movement is imparted to the stem 23 thereby engaging the seat 25 with the valve seat 16. The thrust washers 41 and 42 are formed of a plastic material and provide a low friction mating surface so that rotation of the cap is not imparted to the stem 23. The cylinder and valve may then be used as a storage for the sample of gas and, at periodic intervals, the valve 10 may be attached to an analytical instrument such as gas chromatography apparatus and a sample of the gas may be extracted from the cylinder A.

If a large number of samples are being taken it is readily understood that considerable abuse might be imparted to the valve 10. By the design herein disclosed wherein the stem 23 is fully protected by the handle and isolated from the impacts imparted to the handle, the operating life of the valve is greatly enhanced. Any abuse sustained by the handle is absorbed through the intermeshing threads and, not by the valve body and not the stem. Another feature of the valve is the novel sealing of the stem. Thus, if the sample in the cylinder is to be retained over a long period of time at the high pressures which are normal in such systems there is a distinct problem of sealing the valve under continuous high pressures. In the arrangement disclosed, the sealing of the valve is a minimum problem since a soft seat 25 is utilized which assures a good seal at the seal seat 16. Moreover, the washer 35 is clamped such that all threaded parts are remote from the interior of the valve. The O-ring 34 which is deformed as the internal pressure increases provides a good seal and the synthetic packing gland 33 readily cold flows to fill any crevice which might provide a point of leakage.

It is thus apparent that each of the objects set forth have been accomplished by the valve disclosed herein. Modifications and changes will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment or the terminology employed in describing it is to be limited but rather, it is our desire to be restricted only by the scope of the appended claims.

We claim:

1. A valve comprising:
   a body having a fluid passage therethrough including inlet and outlet ports,
   a valve chamber communicating with said inlet and outlet ports in said body and including a valve seat,
   a bonnet portion on said body,
   a counterbore portion in said bonnet coaxial with said valve chamber and including a transverse shoulder at the juncture of said valve chamber and said counterbore.
   a handle threadedly received over said bonnet portion,
   said handle including a central chamber therein enclosing said bonnet portion,
   a valve stem disposed in said central chamber and extending through said counterbore portion in said bonnet into said valve chamber,
   a packing nut threadedly engaged in the counterbore of said bonnet portion,
   said packing nut including an aperture through which said valve stem projects and a counterbore portion coaxial with said aperture,
   a cylindrical packing gland received in said counterbore portion of said packing nut and surrounding a portion of said stem,
   an O-ring surrounding a portion of said stem and disposed in said counterbore portion of said packing nut,
   a ring gasket received over said stem and clamped between the end of said packing nut and said shoulder,
   said gasket and said packing gland cooperating to define a groove in which said O-ring is disposed,
   the lower end of said stem including a tip adapted to engage the valve seat in said valve chamber,
   the upper end of said stem including a retaining washer secured thereto,
   thrust washers on the upper and lower surfaces of said retaining washer, with the upper thrust washer being in opposed relation to the bottom wall of the chamber in said handle,
   a cylindrical bushing received over said stem and in opposed relation to the lower thrust washer,
   said bushing being rotatable on said stem,
   means securing said bushing to said handle for longitudinal movement therewith whereby movement of said handle causes engagement of said bushing with said lower thrust washer thereby to impart a corresponding longitudinal movement to said stem to displace the tip of said stem from said valve seat in said valve chamber.

2. A valve comprising:
   a body having a fluid passage therethrough including inlet and outlet ports,
   a valve chamber communicating with said inlet and outlet ports in said body and including a valve seat,
   a bonnet portion on said body,
   a counterbore portion in said bonnet coaxial with said valve chamber and including a transverse shoulder at the juncture of said valve chamber and said counterbore,
   a handle threadedly received over said bonnet portion,
   said handle including a central chamber therein enclosing said bonnet portion,
   a valve stem disposed in said central chamber and extending through said counterbore portion in said bonnet into said valve chamber,
   a packing nut threadedly engaged in the counterbore of said bonnet portion,
   said packing nut including an aperture through which said valve stem projects and a counterbore portion coaxial with said aperture,
   a cylindrical packing gland received in said counterbore portion of said packing nut and surrounding a portion of said stem,
   an O-ring surrounding a portion of said stem and disposed in said counterbore portion of said packing nut,
   a ring gasket received over said stem and clamped between the end of said packing nut and said shoulder,
   said gasket and said packing gland cooperating to define a groove in which said O-ring is disposed, and
   means interconnecting said handle with said valve stem whereby said valve stem may be reciprocated toward and away from said valve seat.

3. A valve comprising:
   a body having a fluid passage therethrough including inlet and outlet ports,
   a valve chamber communicating with said inlet and outlet ports in said body and including a valve seat,
   a bonnet portion on said body,
   a handle threadedly received over said bonnet portion,
   said handle including a central chamber therein enclosing said bonnet portion,
   a valve chamber communicating with said inlet and extending into said valve chamber,
   the lower end of said stem including a tip adapted to engage the valve seat in said valve chamber,
   the upper end of said stem including a retaining washer secured thereto,
   thrust washers on the upper and lower surface of said retaining washer with the upper thrust washer being in opposed relation to the bottom wall of the chamber in said handle,
   a cylindrical bushing received over said stem and in opposed relation to the lower thrust washer,
   said bushing being rotatable on said stem,
   means securing said bushing to said handle for longitudinal movement therewith whereby movement of said handle causes engagement of said bushing with said lower thrust washer thereby to impart a corresponding longitudinal movement to said stem to displace the tip of said stem from said valve seat in said valve chamber.

4. A valve comprising:
   a body having a fluid passage therethrough including inlet and outlet ports,
   a valve chamber communicating with said inlet and outlet ports in said body and including a valve seat,
   a bonnet portion on said body,
   a packing nut threadedly received in said bonnet portion,
   an aperture in said packing nut coaxial with said valve chamber,
   single piece stem means in said valve chamber extending through the aperture in said packing nut,
   a handle including a central chamber therein enclosing said bonnet portion and the extending end of said stem means, said central chamber having threads which threadedly engage said bonnet,
   means interconnecting said handle with said extending end of said stem whereby rotational movement of said handle imparts a longitudinal movement to said stem, seal means carried by said packing nut and in engagement with said stem means, and gasket means between said packing nut and said body and extending into said valve chamber thereby retaining said seal means with said packing nut.

5. The valve of claim 2 wherein said cylindrical packing gland is comprised of glass filled Teflon.

6. The combination of claim 3 wherein said retaining washer comprises a snap ring received in a groove formed in the upper end of said stem.

7. The combination of claim 4 wherein
said threads in said chamber are spaced from the open end of said chamber.

References Cited

UNITED STATES PATENTS

| | | | |
|---|---|---|---|
| 926,627 | 6/1909 | Van Nostran | 251—273 |
| 2,696,363 | 12/1954 | Monson | 251—214 X |
| 2,825,529 | 3/1958 | Albrecht | 251—360 |
| 2,831,714 | 4/1958 | Thorburn | 277—112 |
| 3,071,344 | 1/1963 | Banks | 251—214 X |
| 3,222,027 | 12/1965 | Gilleeny | 251—264 |

WILLIAM F. O'DEA, *Primary Examiner.*

D. R. MATTHEWS, *Assistant Examiner.*